United States Patent
Collet (10) Patent No.: US 10,247,141 B2
(45) Date of Patent: Apr. 2, 2019

(54) METHOD FOR DETERMINING A FLOW RATE THROUGH A VALVE

(71) Applicants: CONTINENTAL AUTOMOTIVE FRANCE, Toulouse (FR); CONTINENTAL AUTOMOTIVE GMBH, Hannover (DE)

(72) Inventor: Thierry Collet, Fontenilles (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 235 days.

(21) Appl. No.: 15/120,892

(22) PCT Filed: Feb. 19, 2015

(86) PCT No.: PCT/EP2015/000374
§ 371 (c)(1),
(2) Date: Aug. 23, 2016

(87) PCT Pub. No.: WO2015/128068
PCT Pub. Date: Sep. 3, 2015

(65) Prior Publication Data
US 2016/0363100 A1  Dec. 15, 2016

(30) Foreign Application Priority Data
Feb. 27, 2014  (FR) ...................... 14 51607

(51) Int. Cl.
*G01F 1/00*  (2006.01)
*G01F 7/00*  (2006.01)
(Continued)

(52) U.S. Cl.
CPC ....... *F02M 25/0809* (2013.01); *F02D 41/004* (2013.01); *F02D 41/0045* (2013.01);
(Continued)

(58) Field of Classification Search
CPC ............ F02M 25/0809; F02M 25/0836; F02D 41/004; F02D 41/0045
(Continued)

(56) References Cited
U.S. PATENT DOCUMENTS 8,943,878 B2 * 2/2015 Collet ................ F02M 25/0827
73/114.39
2003/0005916 A1  1/2003 Osanai
(Continued)

FOREIGN PATENT DOCUMENTS

| CN | 102027221 | 4/2011 |
| CN | 102834602 | 12/2012 |

(Continued)

OTHER PUBLICATIONS

K A Venkataraman et al.: "Investigations of Response Time Parameters of a Pneumatic 3/2 Direct Acting Solenoid Valve Under Various Working Pressure Conditions", Technology & Applied Science Research, vol. 3, No. 4, Aug. 31, 2013 (Aug. 31, 2013), pp. 502-505, XP055148867, ISSN: 1792-8036.
(Continued)

*Primary Examiner* — An H Do
(74) *Attorney, Agent, or Firm* — Young & Thompson (57) ABSTRACT

The present invention relates to a method for determining a flow rate (Q) through an on-off valve (1) controlled by means of a pulse width modulated control signal (C) comprising a period (c) of updating the control signal and a control cycle (D), characterized in that, said control signal updating period (c) being a divisor of said control cycle (D), said method of determination comprises a determination period (d), the determination period (d) being shorter than or equal to the updating period (c) of the control signal (C) and being synchronized with the control signal (C), said determination period (d) being a period of refreshment of a
(Continued)

determination of said flow rate (Q) through said on-off valve (1).

20 Claims, 4 Drawing Sheets (51) Int. Cl.
  *F02M 25/08*    (2006.01)
  *G01F 1/72*    (2006.01)
  *F02D 41/00*    (2006.01)
  *G01F 15/02*    (2006.01)
  *F02D 41/20*    (2006.01)

(52) U.S. Cl.
  CPC .......... *F02M 25/0836* (2013.01); *G01F 1/72* (2013.01); *G01F 15/02* (2013.01); *F02D 41/0042* (2013.01); *F02D 2041/2027* (2013.01)

(58) Field of Classification Search
  USPC .............................................. 702/33, 45, 46
  See application file for complete search history.

(56) References Cited

U.S. PATENT DOCUMENTS

| | | |
|---|---|---|
| 2010/0268437 A1 | 10/2010 | Bauer |
| 2011/0120423 A1 | 5/2011 | Borchsenius et al. |
| 2013/0000395 A1 | 1/2013 | Collet |
| 2013/0104636 A1 | 5/2013 | Beer et al. |
| 2014/0326218 A1 | 2/2014 | Ruβe et al. |

FOREIGN PATENT DOCUMENTS

| | | |
|---|---|---|
| CN | 102959218 | 3/2013 |
| CN | 103518056 | 1/2014 |
| EP | 1 302 756 A2 | 4/2003 |

OTHER PUBLICATIONS

Bosch Rexroth et al.: "Master Thesis Proposal: PWM controlled 2/2 solenoid valves", Oct. 9, 2013 (Oct. 9, 2013), XP055148908, Retrieved from the Internet <URL:http://www.iei.liu.se/flumes/master-s-thesis/proposal/1.523445/Examensarbete_BRP_pwm_solenoider_131009.pdf> [retrieved on Oct. 24, 2014].

International Search Report, dated Apr. 28, 2015, from corresponding PCT application.

Chinese Office Action dated Jun. 29, 2018 in corresponding Chinese Patent Application No. 201580010910.0 with English translation of Chinese Office Action.

Li Qibo, Electro-hydraulic Proportional Control and Digital Control System, Jun. 30, 1997, China Machine Press, pp. 481-487, CPME1643738P.

\* cited by examiner

METHOD FOR DETERMINING A FLOW RATE THROUGH A VALVE

The present invention relates to the control of an on-off valve by a pulse width modulated signal. More particularly, the invention relates to a method for determining the flow rate through a valve of this kind.

BACKGROUND OF THE INVENTION

There is a known way of using a pulse width modulated signal for the proportional control of an on-off valve. A valve of this kind is typically returned to a default position, for example a closed position, and can be actuated to another position, for example an open position, by means of a control signal.

It is desirable to have a precise knowledge of the flow rate through a valve of this kind.

There is a known way of estimating a flow rate through an on-off valve actuated by a pulse width modulated control signal, by calculating a flow rate value for each control cycle. There is also a known document US 2003/0005916 A1 which proposes to calculate a flow rate value once in every two control cycles. However, this temporal resolution appears to be insufficient for certain applications, such as the control of a fuel vapor filter purge valve.

SUMMARY OF THE INVENTION

Thus the present invention proposes to refine the preceding paradigm and to calculate a flow rate value according to a determination period shorter than or equal to the control period, which is a divisor of the control cycle.

The invention relates to a method for determining a flow rate through an on-off valve controlled by means of a pulse width modulated control signal comprising a period of updating the control signal and a control cycle, characterized in that, said control signal updating period being a divisor of said control cycle, said method of determination comprises a determination period, the determination period being shorter than or equal to the control signal updating period and being synchronized with the control signal, said determination period being a period of refreshment of a determination of said flow rate through said on-off valve.

According to another characteristic, the method comprises the following steps:
 determining a position of the valve,
 determining an elementary flow rate through the valve, and
 estimating the flow rate by integration of the elementary flow rates over a determination period.

According to another characteristic, the steps of determining a position and determining an elementary flow rate are executed according to a period which is a divisor of the determination period.

According to another characteristic, the position of the valve is considered to be open if the control signal has been in the active state for more than an opening reaction time, and is closed if the control signal has been in the inactive state for more than a closing reaction time.

According to another characteristic, the opening reaction time and/or the closing reaction time is/are a function of the temperature, the differential pressure between the upstream and downstream sides of the valve, and the maximum amplitude of the control signal.

According to another characteristic, the elementary flow rate is considered to be equal to a maximum flow rate if the valve position is open, and equal to a zero flow rate if the valve position is closed.

According to another characteristic, the elementary flow rate is considered to be equal to a maximum flow rate if the valve position has been open for more than a starting time, and comprises a first-order starting transient between the zero flow rate, at the opening of the valve, and the maximum flow rate, reached after a starting time following the opening of the valve, the starting time being a function of the differential pressure between the upstream and downstream sides of the valve.

According to another characteristic, the elementary flow rate is considered to be equal to a zero flow rate if the valve position has been closed for more than an ending time, and comprises a first-order ending transient between the maximum flow rate, at the closing of the valve, and the zero flow rate, reached after an ending time following the closing of the valve, the ending time being a function of the differential pressure between the upstream and downstream sides of the valve.

According to another characteristic, the maximum flow rate is a function of the temperature and the differential pressure between the upstream and downstream sides of the valve.

According to another characteristic, the method is applied to a fuel vapor filter purge valve.

The invention also relates to a device implementing the method.

The invention also relates to a vehicle comprising this device.

BRIEF DESCRIPTION OF THE DRAWINGS

Other characteristics, details and advantages of the invention will be more fully apparent from the detailed description provided below for guidance only, with reference to the drawings, in which.

DETAILED DESCRIPTION OF THE PREFERRED EMBODIMENTS

Figure 1:
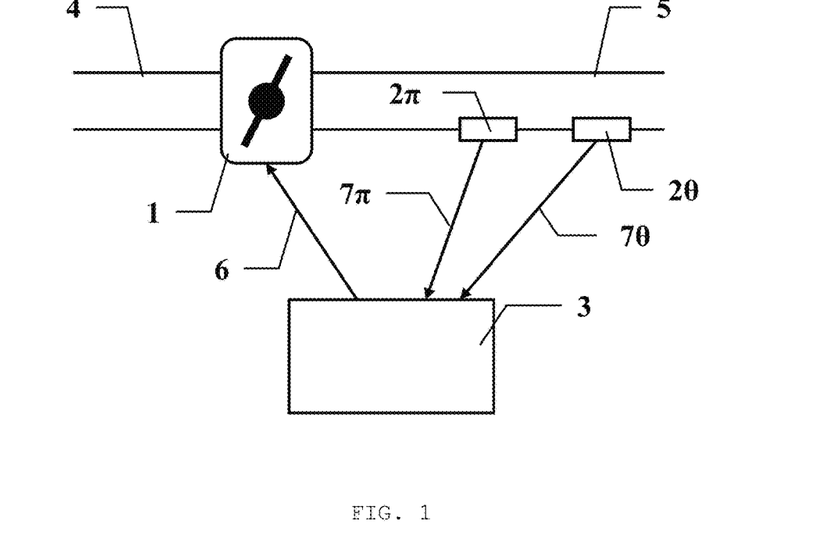
FIG. 1 is a schematic illustration of a valve in its environment.

FIG. 1 shows a typical environment of the invention. A valve 1 is positioned between an upstream line 4 and a downstream line 5. Thus it enables a fluid transfer to be directed between the two lines 4 and 5, according to its open or closed position, as long as there is some differential pressure $\pi$ between the upstream side 4 and the downstream side 5. The valve 1 is an on-off valve. It is typically returned to a rest position, for example a closed position, in the absence of a control signal. A control signal can cause the position of the valve 1 to change to the opposite position, for example an open position.

A processing unit 3 can perform the calculations and processing and can selectively control the movement of the valve 1 to its open position, by a control signal for example, or to its closed position F, by the absence of a control signal for example.

Said processing unit 3 also receives a measurement $7\pi$, sent from a pressure sensor $2\pi$, indicating the differential pressure $\pi$, and a measurement $7\theta$, sent from a temperature sensor $2\theta$, indicating the temperature $\theta$.

Although the valve 1 is of the on-off type, it is possible to provide proportional control in a known manner, using a pulse width modulated (PWM in English) control signal 6, C. A PWM signal 6, C is a binary signal. The principle is to modulate the time interval for which the PWM signal 6, C is in the high state Cmax. Thus time proportionality is provided in order to simulate amplitude proportionality.

Figure 2:
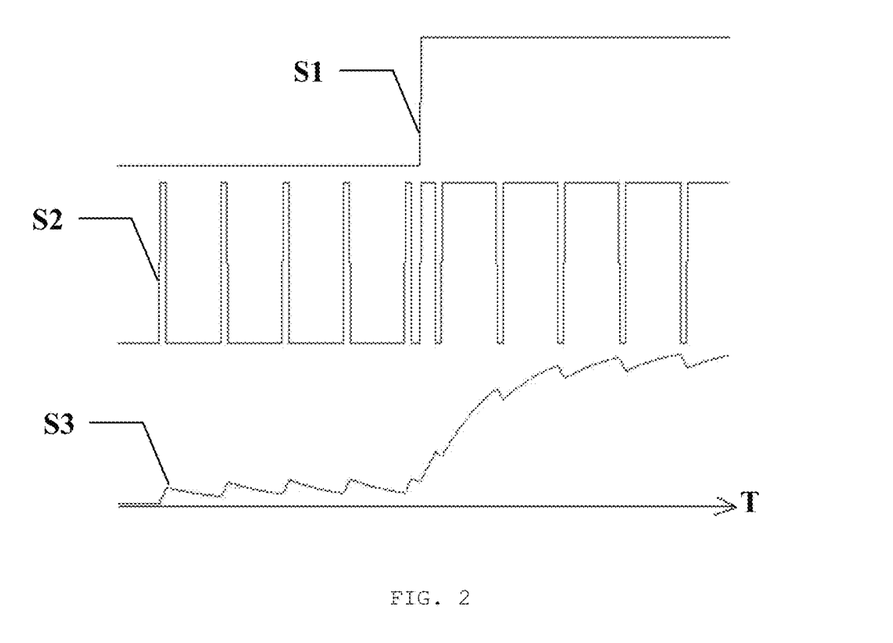
FIG. 2 shows the principle of pulse wave modulated signal.

This is shown in FIG. 2, comprising three signal curves which are functions of the time T. The top curve S1 is the signal to be applied, in this case a step. The middle curve S2 is the corresponding PWM signal. The bottom curve S3 is the signal as received by a load, providing an integration with respect to time of the PWM signal S2, and substantially reproducing the signal S1.

Figure 3:
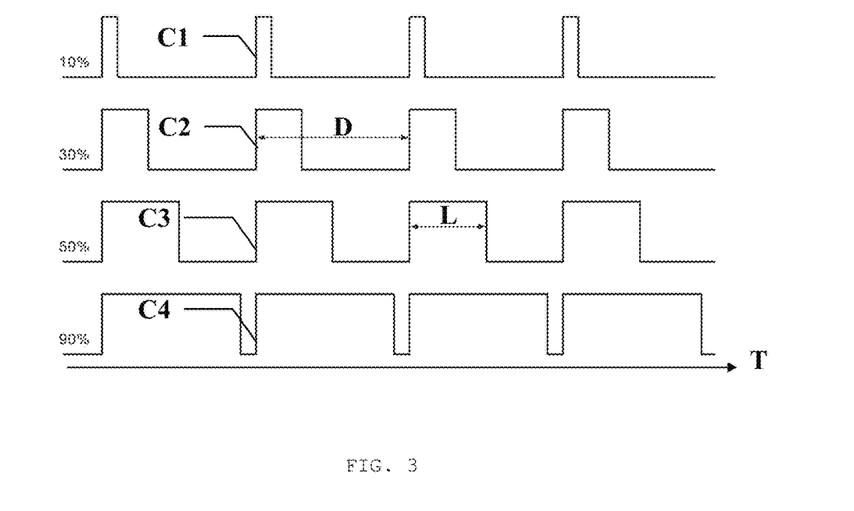
FIG. 3 shows the concept of the duty cycle.

An important quantity for characterizing a PWM signal is a duty cycle R, more particularly illustrated in FIG. 3. A PWM control signal is usually discretized over time intervals or cycles D. The duty cycle R is defined for each cycle as the ratio of the time L for which the signal is in the high state to the total time of the cycle D:R=100*L/D. This ratio is multiplied by 100 to be expressed as a percentage. FIG. 3 shows, from top to bottom, four curves C1-C4 which are functions of time T, having the following duty cycles R respectively: C1, 10%; C2, 30%; C3, 50%; and C4, 90%.

Figure 4:
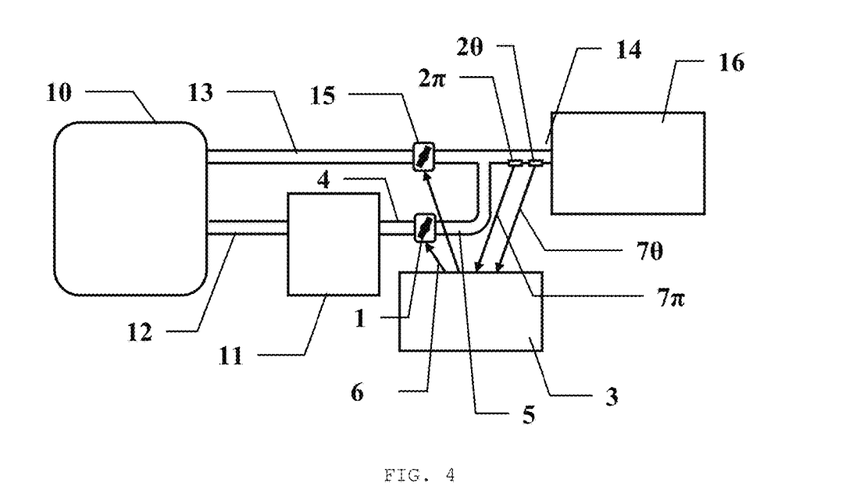
FIG. 4 is a schematic illustration of an intake circuit and a filter purge valve.

A particular application of the invention relates to a fuel vapor filter purge valve for a motor vehicle. As shown in FIG. 4, which depicts a partial diagram of the fuel supply system of a motor vehicle engine 16, a vapor filter 11, also known as a canister 11, is associated with a fuel tank 10. The filter 11 is connected to the tank 10 by a line 12 for collecting and storing excess fuel vapors.

The nominal fuel intake circuit is represented by an intake valve 15 connected to the tank 10 by a line 13 which supplies it with fuel, and to the engine 16 by an intake line or manifold 14 which can be used to inject the fuel into the engine 16. For the sake of simplicity, the component which adds air and mixes it with the fuel is not shown.

The filter 11 needs to be purged so that it can be cleaned. For this purpose, an additional line 4, 5 is provided, connecting the filter 11 to the intake manifold 14. Thus the fuel vapors stored in the filter 11 can be used by the intake system. A valve 1 can be used to control the purging of the filter 11 into the intake manifold 14 and, when said purge valve 1 is open, to inject the fuel vapors from the filter 11 into the engine 16.

A processing unit 3 monitors the engine and controls the intake, as well as the operation of the filter 11. For this purpose, the processing unit 3 controls at least the intake valve 15 by means of a control signal and controls the purge valve 1 by means of another control signal 6, C. In a conventional manner, a pressure sensor $2\pi$ is placed in the intake manifold 14 and supplies a pressure signal $7\pi$ to the processing unit 3. A temperature sensor $2\theta$ is also placed in the intake manifold 14 and supplies a temperature signal $7\theta$ to the processing unit 3. Other sensors, not shown, such as a fuel richness sensor, may also advantageously be interfaced with the processing unit 3.

If the purge valve 1 is controlled so as to purge the filter 11, the fuel vapors are injected from the filter 11 toward the intake manifold 14. So that the engine control can effectively control the amount of fuel admitted, it should be informed of the precise amount of vapor, so that this amount can be deducted from the amount admitted by the nominal circuit 13, 15. For this purpose, it may be useful to provide an estimate of the flow rate Q through the purge valve 1.

Figure 5:
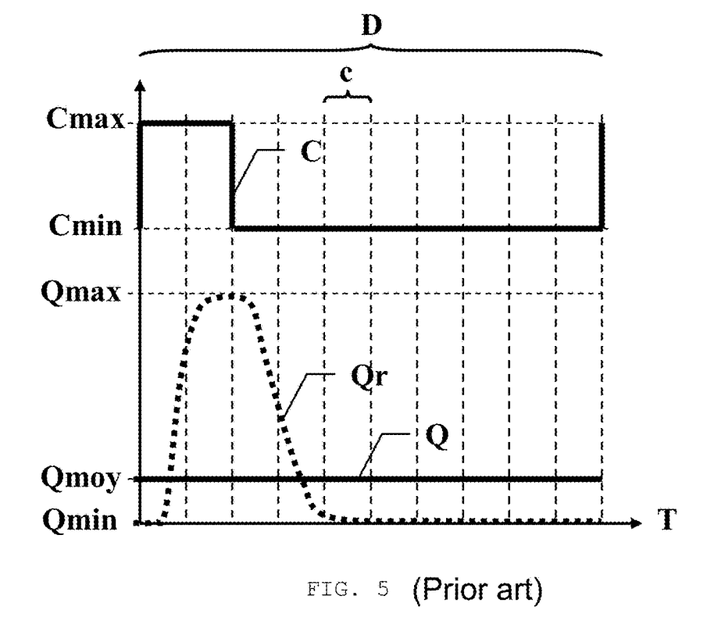
FIG. 5 shows a comparative time curve of a control signal, the resulting flow rate and its modeling according to the prior art.

With reference to FIG. 5, a cycle D of a control signal C is shown in detail. For guidance, the duration of a cycle D may be about 100 ms. The flow rate Qr which is actually obtained is shown opposite a control signal C on the same diagram as a function of time T. It can be seen that said flow rate Qr substantially reproduces the control signal C with a delay, both during the rise/opening and during the fall/closing of the valve 1. To avoid the complexity of the determination of the different delay times, a simplistic model has been used hitherto, the estimated flow rate Q being assumed to be constant over a cycle D. Thus, as shown in FIG. 5, the estimated flow rate Q is equal to a mean value Qmoy over said cycle D. This mean value Qmoy is an increasing function of the duty cycle R. To a first approximation, Qmoy can be considered equal to R.Qmax, where Qmax is the maximum flow rate, that is to say the flow rate passing through in steady state, with the valve 1 in the open position. Thus, for the example shown in FIG. 1, where the duty cycle R=20%, the flow rate Q is determined to be equal to 20% of the flow rate Qmax.

This simplistic model disregards the variations of the flow rate Q in the course a cycle D. This is harmful in some applications. Thus, in the example of application to a purge valve 1 of a fuel vapor filter 11, a richness corrector, operating over a period 10 to 100 times smaller than the cycle D, constantly uses a flow rate Q which is sometimes overestimated and sometimes underestimated. This creates oscillations in the adjustments of the flow rates of air or fuel admitted, which in certain cases, notably during deceleration, may even cause the engine to stall.

One object of the invention is to propose an estimation of the flow rate Q based on a much shorter period of refreshment of determination, typically shorter than a period c of updating the control signal C, or control period c; that is to say, in the example of FIG. 5, based on a period c which is 10 times shorter than the cycle D. For guidance, the duration of a period c is 10 ms.

The control signal C is a pulse width modulation signal. This signal has two states, namely a high state Cmax and a low state Cmin. The high state is assumed to correspond to a control signal for opening the valve 1, while the low state is assumed to correspond to an absence of a control signal, the valve 1 then being returned to the closed position. In this case, a cycle D is divided into 10 control periods c. Over a period c, the control signal C retains the same value of Cmax or Cmin. This value may change between two of these periods c. In the illustrated example, the control signal C is in the high state Cmax during the first two periods c and in the low state Cmin during the other eight periods c, that is to say it follows a duty cycle of 20%.

Figure 6:
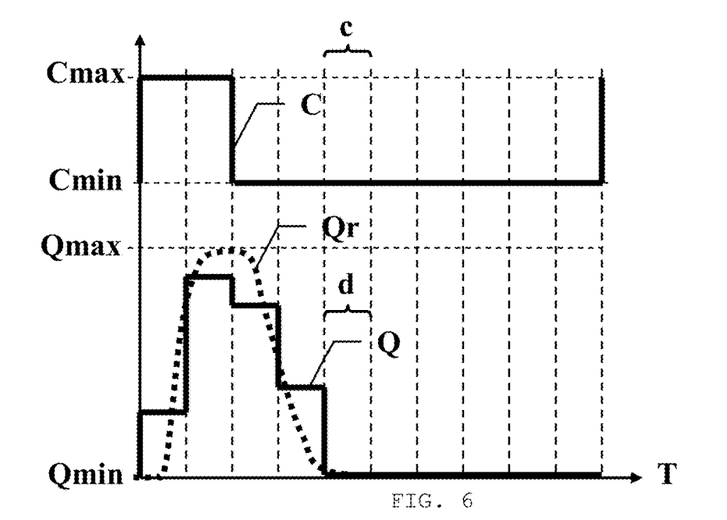
FIG. 6 shows a comparative time curve of a control signal, the resulting flow rate and its modeling according to the invention.

This control signal C product causes an opening of the valve 1, followed by a closing. Since there is a pressure difference $\pi$ between the upstream side 4 and the downstream side 5 of the valve 1, this opening produces a flow rate Qr. In FIGS. 5 and 6, the dotted curve Qr depicts the actual flow rate obtained.

FIG. 5 shows the prior art model, in which the flow rate Q is considered to be constant, equal to a mean flow rate Qmoy, over the duration of the cycle D.

FIG. 6 shows the more detailed model of the invention, where the flow rate Q is estimated for each determination period d.

According to an important characteristic of the invention, this determination period d is set to be much shorter than the duration of the cycle D, and at least shorter than or equal to the period c of updating the control signal C. The determination period d is advantageously synchronized with the control signal C. Thus, for example, a rising edge of the control signal C typically coincides with a period d.

According to an advantageous embodiment, the determination period d is equal to, and superimposed on, the period c of updating the operating signal. According to another embodiment, the period d of determination of the flow rate Q is a submultiple of the period c.

This increase in the temporal resolution makes it possible to obtain a model of the flow rate Q which is much more faithful to the actual real flow rate Qr.

A method for determining the flow rate Q enabling this resolution characteristic to be achieved according to the invention can be broken down into a number of steps.

In the first place, a position a of the valve 1 is determined. On the basis of this position, an elementary flow rate q through the valve 1 is then determined. Finally a step of estimating the flow rate Q is executed, which integrates/averages the elementary flow rates q over a determination period d.

Figure 7:
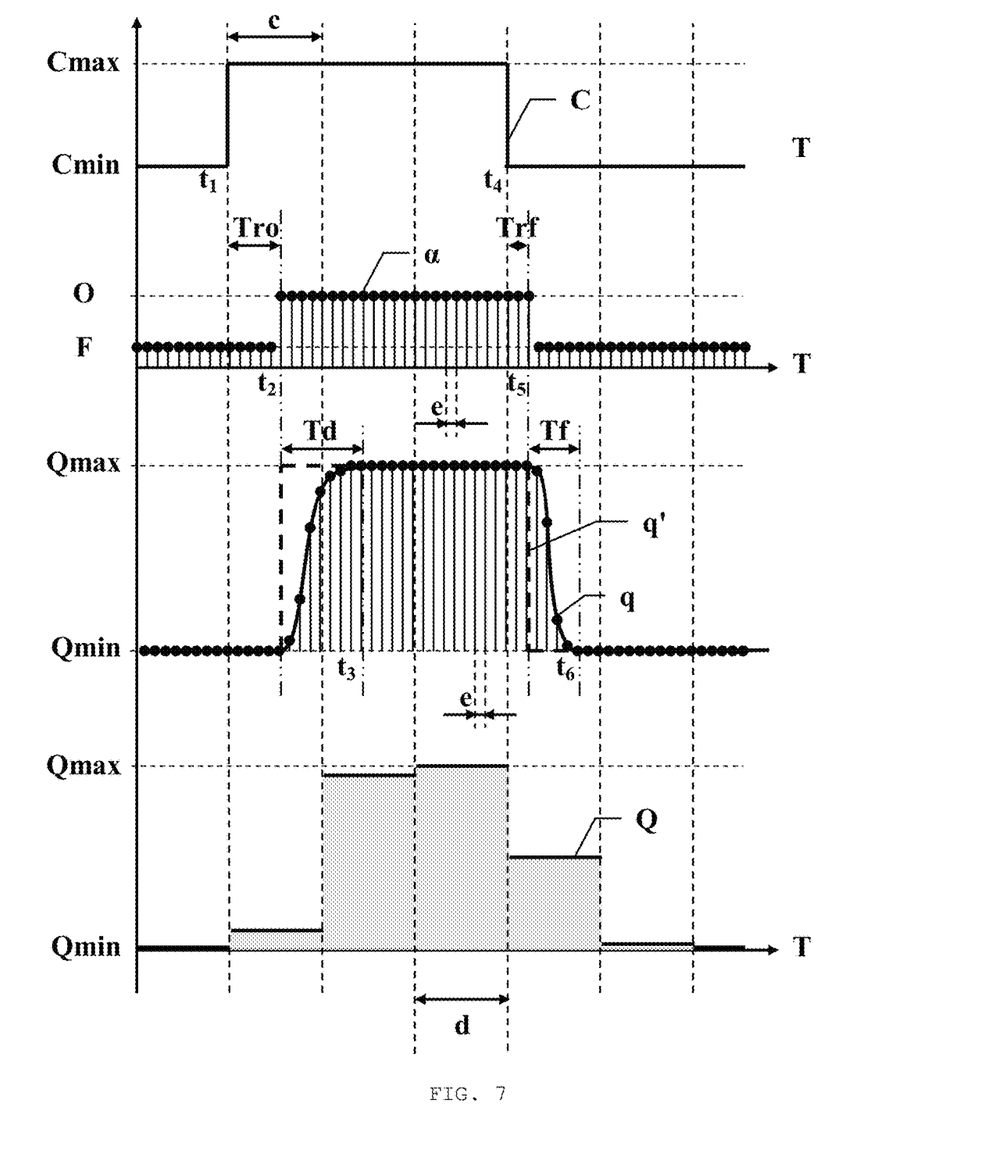
FIG. 7 shows the various models used by the invention.

To approach the reality of the modeled process as closely as possible, it is desirable to over-sample relative to the determination period d. Additionally, according to a characteristic of the invention, the steps of determining a position a and determining an elementary flow rate q are advantageously executed according to a period e which is a divisor of the determination period d. As shown in FIG. 7, the period e divides the determination period d, by a factor of nine in this case.

An embodiment of the invention will now be described more fully with reference to FIG. 7.

FIG. 7 shows four curves, from top to bottom, in a diagram as a function of time T.

The first curve depicts a control signal C. The second curve depicts the position a of the valve 1 resulting from this control signal C. The third curve shows the flow rate and the mode of calculating the elementary flow rates q. The fourth curve shows the estimated flow rate Q, over each determination period d.

By contrast with FIGS. 5 and 6, in FIG. 7 a horizontal zoom has been applied, to show mainly the first part of the cycle D, where the control signal C is in the high/active state Cmax.

The control signal C is in the active state Cmax during three consecutive periods c, and is in the inactive/low state Cmin during all the other periods of the cycle D. The control signal C changes to the active state Cmax at the instant $t_1$, and to the inactive state Cmin at the instant $t_4$.

A first step of the method is to determine the position α of the valve 1. The valve 1 is an on-off valve, and its position α can have only two values: open O or closed F. The model used to determine this position α assumes that the position α of the valve 1 follows the control signal C, with delays. Thus a first delay or reaction time to the opening Tro is interposed between the instant $t_1$ when the control signal C changes to the active state Cmax and the instant $t_2$ when the valve 1 changes from the closed position F to the open position O. Similarly, a second delay or reaction time to the closing Trf is interposed between the instant $t_4$ when the control signal C changes to the active state Cmin and the instant $t_5$ when the valve 1 changes from the open position O to the closed position F. Thus this model can be used to determine the position α of the valve 1. The valve 1 is open O if the control signal C has been in the active state Cmax for a time longer than the opening reaction time Tro, and is closed F if the control signal C has been in the inactive state Cmin for a time longer than the closing reaction time Trf.

The model for determining the position a of the valve 1 is complete when the two delays Tro and Trf have been determined.

According to a first approximate embodiment, the reaction time to opening Tro and/or the reaction time to closing Trf is/are considered to be constant. By way of guidance, the reaction time to opening Tro can be assumed to be equal to a value between 4 and 10 ms. Similarly, the reaction time to closing Trf, which is generally shorter, can be assumed to be equal to a value between 2 and 4 ms.

According to another, more precise, embodiment, the reaction time to opening Tro and/or the reaction time to closing Trf is/are determined by a function of at least one environmental variable. The environmental variables considered for the present purposes comprise the temperature θ, the differential pressure π between the upstream side 4 and downstream side 5 of the valve 1, and the maximum amplitude Cmax of the control signal C.

The temperature θ is the temperature of the fluid near the valve 1. It may be measured, for example, by a temperature sensor 2θ.

The differential pressure π is the pressure difference between the upstream side 4 and the downstream side 5 of the valve 1. It may be measured, for example, by two pressure sensors, positioned respectively upstream 4 and downstream 5 of the valve, or by a single pressure sensor 2π positioned downstream 5 if the upstream pressure is substantially constant.

The maximum amplitude Cmax of the control signal C of the valve 1 is indicative of the available power. Thus, in a motor vehicle, this amplitude Cmax is typically correlated with the battery voltage.

Each of these environmental variables π, θ, Cmax is determined by the method, by measurement or by estimation.

The reaction time to opening Tro can then be determined by a first function F1 of at least one of these three environmental variables π, θ, Cmax. The reaction time to closing Trf can then be determined by a second function F2 of at least one of these three environmental variables 90, θ, Cmax. Tro=F1 (π, θ, Cmax) and Trf=F2 (π, θ, Cmax).

The functions F1 and F2 for the determination of the two reaction times Tro, Trf are typically identified in advance, and are, for example, tabulated or stored in any other form in the processing unit 3. These functions F1, F2 can be identified, for example, by means of a theoretical model of the valve 1. However, for the reaction times Tro, Trf which are difficult to model, these functions F1, F2 are advantageously identified on the test bench, using a nominal valve 1 representative of the valve used.

When the position α of the valve 1 has been determined in this way, a second step of determining an elementary flow rate q can be executed. A flow rate model is used for this purpose.

According to a first embodiment, the flow rate model is simplified, and assumes that a maximum flow rate Qmax is established as soon as the valve 1 is open O, and that a flow rate becomes minimal Qmin/zero as soon as the valve 1 is closed F.

If the valve 1 is completely closed in the closed position F, the flow rate Qmin is assumed to be zero. This assumption is accepted for the remainder of the description.

According to this simplified model, corresponding to the rectangular curve q' shown in dotted lines, the elementary flow rate q' is equal to the maximum flow rate Qmax for any period e when the valve 1 is open O, and is equal to the minimum flow rate Qmin, and therefore to the zero flow rate, for any period e when the valve 1 is closed F.

According to another embodiment, the flow rate model is refined in that it comprises, after the opening of the valve 1, a starting transient between the minimum flow rate Qmin and the maximum flow rate Qmax, with progressive establishment of the flow rate. This transient offers a progressive transition, and may be provided by a 1st-order model, starting at an instant $t_2$ when the valve 1 opens with a minimum/zero flow rate Qmin, and terminating at an instant $t_3$ with a maximum flow rate Qmax, the instant $t_3$ being later by a starting time Td than the instant $t_2$. The time constant of the 1st-order model is determined so that the starting transient conforms to a given starting time Td.

According to another embodiment which is alternative or complementary to the preceding embodiment, the flow rate model is refined in a similar way for the closing of the valve 1, in that it comprises an ending transient between the maximum flow rate Qmax and the minimum flow rate Qmin, with progressive reduction of the flow rate. This transient offers a progressive transition, and may be provided by a 1st-order model, starting at an instant $t_5$ when the valve 1 closes with a maximum flow rate Qmax, and terminating at an instant $t_6$ with a minimum/zero flow rate Qmin, the instant $t_6$ being later by an ending time Tf than the instant $t_5$. The time constant of the 1st-order model is determined so that the starting transient conforms to a given ending time Tf.

According to a first embodiment, the starting time Td and/or the ending time Tf may be assumed to be constant. By way of guidance, the starting time Td may be assumed to be equal to a value between 4 and 20 ms. Similarly, the ending time Tf, which is generally shorter, can be assumed to be equal to a value between 2 and 8 ms.

According to another, more refined, embodiment, the starting time Td and/or the ending time Tf is/are a function of the differential pressure $\pi$ between the upstream and downstream sides of the valve 1.

The starting time Td may then be determined by a first function F3 of the environmental variable $\pi$. The ending time Tf may then be determined by a second function F4 of the environmental variable $\pi$. Td=F3 ($\pi$) and Tf=F4 ($\pi$).

The functions F3 and F4 for the determination of the two times Td, Tf are typically identified in advance, and are, for example, tabulated or stored in any other form in the processing unit 3. The functions F3, F4 can be identified, for example, by means of a theoretical model of the valve 1. Alternatively, the functions F3, F4 may be identified on the test bench, using a nominal valve 1 representative of the valve used.

The various embodiments described above use a maximum flow rate Qmax. This maximum flow rate Qmax may be assumed to be constant. However, an advantageous model determines a maximum flow rate Qmax which is a function of the temperature $\theta$ and of the differential pressure $\pi$ between the upstream side 4 and downstream side 5 of the valve 1.

Thus a function F5 can be used to determine the maximum flow rate Qmax, with Qmax=F5 ($\theta,\pi$).

The function F5 for the determination of the maximum flow rate Qmax is typically identified in advance, and is, for example, tabulated or stored in any other form in the processing unit 3. The functions F5 can be identified, for example, by means of a theoretical model of the valve 1. The function F5 may also be defined by means of a graph produced by the manufacturer of the valve 1. Alternatively, the function F5 may be identified on the test bench, using a nominal valve 1 representative of the valve used.

As stated above, the method uses the control signal C, notably in order to know the instants $t_1$ and $t_4$ of change of state. The operating signal C is produced by a computer and can thus be communicated via an interface to the processing unit 3. According to one embodiment, said computer is combined with the processing unit 3, and said interface is internal.

When the elementary flow rate q has been determined for each period e of calculation according to the flow rate model accepted, a final step performs an integration of the elementary flow rates q over each of the periods d of determination of the flow rate. This enables the desired result to be obtained, namely an estimated flow rate Q with a temporal resolution having a period d. This is illustrated by the fourth curve Q of FIG. 7.

The invention claimed is:

1. A method for determining a flow rate (Q) through an on-off valve (1), an on state and an off state of the valve being controlled by means of a pulse width modulated control signal (C) generated by a processing unit in communication with the on-off valve, the control signal (C) operating in accordance with a control cycle (D) and updating at a rate defined by a plurality of update periods (c) occurring over a course of the control cycle (D) said update period (c) being a divisor of said control cycle (D), said method comprising:
   carrying out, at the processing unit and at a frequency defined by a determination period (d), a determination of a position ($\alpha$) of the valve (1), and a calculation of an estimated flow rate (Q) based on the determined position ($\alpha$) of the valve (1),
   wherein the determination period (d) is shorter than or equal to the update period (c) of the control signal (C), and the determination period is synchronized with the control signal (C),
   said processing unit operating to refresh the estimated flow rate (Q) through said on-off valve (1) at each determination period (d).

2. The method as claimed in claim 1, wherein calculating the estimated flow rate (Q) includes each of:
   determining an elementary flow rate (q) through the valve (1), based on the determined position ($\alpha$) of the valve (1); and
   integrating the elementary flow rate (q) over the determination period (d) to obtain the estimated flow rate (Q).

3. The method as claimed in claim 2, wherein the steps of determining a position ($\alpha$) and determining an elementary flow rate (q) are executed at a frequency defined by a period (e), where said period (e) is a divisor of the determination period (d).

4. The method as claimed in claim 3,
   wherein the position ($\alpha$) of the valve (1) is determined as being open (O) when the control signal (C) has been in an active state for a time longer than an opening reaction time (Tro), and wherein the position (α) of the valve (1) is determined as being closed (F) when the control signal (C) has been in an inactive state for a time longer than a closing reaction time (Trf).

5. The method as claimed in claim 3, wherein the elementary flow rate (q) is determined by the processing unit as being equal to a maximum flow rate (Qmax) when the position (α) of the valve (1) is open (O), and wherein the elementary flow rate (q) is determined by the processing unit as being equal to a zero flow rate when the position (α) of the valve (1) is closed (F).

6. The method as claimed in claim 3, wherein the elementary flow rate (q) is determined to be equal to a maximum flow rate (Qmax) when the position (α) of the valve (1) has been open (O) for more than a starting time (Td), and comprises a first-order starting transient between a zero flow rate, at an opening of the valve (1), and a maximum flow rate (Qmax), reached after a starting time (Td) following the opening of the valve (1), the starting time (Td) being a function of a differential pressure (π) between upstream and downstream sides of the valve (1).

7. The method as claimed in claim 3, wherein the elementary flow rate (q) is determined to be equal to a zero flow rate when the position (α) of the valve (1) has been open (F) for more than an ending time (Tf), and comprises a first-order ending transient between a maximum flow rate (Qmax), at a closing of the valve (1), and the zero flow rate, reached after an ending time (Tf) following a closing of the valve (1), the ending time (Tf) being a function of a differential pressure (π) between upstream and downstream sides of the valve (1).

8. The method as claimed in claim 2, wherein the position (α) of the valve (1) is determined as being open (O) when the control signal (C) has been in an active state for a time longer than an opening reaction time (Tro), and wherein the position (α) of the valve (1) is determined as being closed (F) when the control signal (C) has been in an inactive state for a time longer than a closing reaction time (Trf).

9. The method as claimed in claim 8, wherein the opening reaction time (Tro) and the closing reaction time (Trf) are determined by the processing unit as a function of a temperature (θ) obtained by the processing unit from a temperature sensor, a differential pressure (π) between upstream (4) and downstream (5) sides of the valve (1) obtained by the processing unit from a temperature sensor, and a maximum amplitude (Cmax) of the control signal (C).

10. The method as claimed in claim 8, wherein the elementary flow rate (q) is determined by the processing unit as being equal to a maximum flow rate (Qmax) when the position (α) of the valve (1) is open (O), and wherein the elementary flow rate (q) is determined by the processing unit as being equal to a zero flow rate when the position (α) of the valve (1) is closed (F).

11. The method as claimed in claim 8, wherein the elementary flow rate (q) is determined to be equal to a maximum flow rate (Qmax) when the position (α) of the valve (1) has been open (O) for more than a starting time (Td), and comprises a first-order starting transient between a zero flow rate, at an opening of the valve (1), and a maximum flow rate (Qmax), reached after a starting time (Td) following the opening of the valve (1), the starting time (Td) being a function of a differential pressure (π) between upstream and downstream sides of the valve (1).

12. The method as claimed in claim 8, wherein the elementary flow rate (q) is determined to be equal to a zero flow rate when the position (α) of the valve (1) has been open (F) for more than an ending time (Tf), and comprises a first-order ending transient between a maximum flow rate (Qmax), at a closing of the valve (1), and the zero flow rate, reached after an ending time (Tf) following a closing of the valve (1), the ending time (Tf) being a function of a differential pressure (π) between upstream and downstream sides of the valve (1).

13. The method as claimed in claim 2, wherein the elementary flow rate (q) is determined by the processing unit as being equal to a maximum flow rate (Qmax) if when the position (α) of the valve (1) is open (O), and wherein the elementary flow rate (q) is determined by the processing unit as being equal to a zero flow rate when the position (α) of the valve (1) is closed (F).

14. The method as claimed in claim 13, wherein the maximum flow rate (Qmax) is a function of a temperature (θ) and of a differential pressure (π) between upstream and downstream sides of the valve (1).

15. The method as claimed in claim 2, wherein the elementary flow rate (q) is determined to be equal to a maximum flow rate (Qmax) when the position (α) of the valve (1) has been open (O) for more than a starting time (Td), and comprises a first-order starting transient between a zero flow rate, at an opening of the valve (1), and a maximum flow rate (Qmax), reached after a starting time (Td) following the opening of the valve (1), the starting time (Td) being a function of a differential pressure (π) between upstream and downstream sides of the valve (1).

16. The method as claimed in claim 2, wherein the elementary flow rate (q) is determined to be equal to a zero flow rate when the position (α) of the valve (1) has been open (F) for more than an ending time (Tf), and comprises a first-order ending transient between a maximum flow rate (Qmax), at a closing of the valve (1), and the zero flow rate, reached after an ending time (Tf) following a closing of the valve (1), the ending time (Tf) being a function of a differential pressure (π) between upstream and downstream sides of the valve (1).

17. The method as claimed in claim 2, wherein wherein the determination period (d) is shorter than the update period (c) of the control signal (C).

18. The method as claimed in claim 1, applied to a purge valve (1) of a fuel vapor filter (11).

19. A device implementing the method as claimed in claim 1.

20. A vehicle comprising a device as claimed in claim 19.

* * * * *